US011812511B2

(12) United States Patent
Ramalingam

(10) Patent No.: US 11,812,511 B2
(45) Date of Patent: Nov. 7, 2023

(54) TCP ACKNOWLEDGMENT LATENCY OPTIMIZATION

(71) Applicant: MAVENIR NETWORKS, INC., Richardson, TX (US)

(72) Inventor: Manoharan Ramalingam, Bengaluru (IN)

(73) Assignee: MAVENIR NETWORKS, INC., Richardson, TX (US)

( * ) Notice: Subject to any disclaimer, the term of this patent is extended or adjusted under 35 U.S.C. 154(b) by 186 days.

(21) Appl. No.: 17/159,364

(22) Filed: Jan. 27, 2021

(65) Prior Publication Data
US 2021/0307110 A1 Sep. 30, 2021

Related U.S. Application Data

(60) Provisional application No. 63/002,591, filed on Mar. 31, 2020.

(51) Int. Cl.
| | |
|---|---|
| *H04W 80/06* | (2009.01) |
| *H04L 1/00* | (2006.01) |
| *H04L 1/1812* | (2023.01) |
| *H04L 5/00* | (2006.01) |
| *H04W 28/02* | (2009.01) |
| *H04W 72/21* | (2023.01) |

(52) U.S. Cl.
CPC .......... *H04W 80/06* (2013.01); *H04L 1/0009* (2013.01); *H04L 1/1812* (2013.01); *H04L 5/0055* (2013.01); *H04W 28/0273* (2013.01); *H04W 72/21* (2023.01)

(58) Field of Classification Search
CPC . H04W 80/06; H04W 28/0273; H04W 72/21; H04W 28/06; H04L 1/0009; H04L 1/1812; H04L 5/0055
See application file for complete search history.

(56) References Cited

U.S. PATENT DOCUMENTS

| | | | | |
|---|---|---|---|---|
| 2015/0289289 | A1* | 10/2015 | Qian | ...................... H04L 5/0055 |
| | | | | 370/329 |
| 2015/0358247 | A1* | 12/2015 | Li | .......................... H04L 43/103 |
| | | | | 370/389 |
| 2016/0113031 | A1 | 4/2016 | Sun et al. | |
| 2018/0070367 | A1* | 3/2018 | Fujishiro | ........... H04W 52/0216 |

(Continued)

OTHER PUBLICATIONS

Extended European Search Report for corresponding European application EP21155583.4, 25 pages, dated Nov. 23, 2021.
(Continued)

*Primary Examiner* — Minh Trang T Nguyen
(74) *Attorney, Agent, or Firm* — Ruggiero, McAllister & McMahon LLC

(57) ABSTRACT

A method of reducing the transmission control protocol acknowledgment (TCP ACK) latency, e.g., in 5G New Radio (NR) or LTE system, is provided, which method is triggered, e.g., for user equipments (UEs) with uplink (UL) inactivity. The time estimation to find the TCP ACK packet arrival is based on estimation time split up in the UE side. In addition, the TCP ACK size estimation is based on the number of TCP data packets sent in Physical Downlink Shared Channel (PDSCH). Furthermore, the first "proactive allocation window" (the number of the transmission time intervals (TTIs) over which the proactive allocations are given to UE) is set to 4, and subsequently the "proactive allocation window" may be adapted based on learning.

14 Claims, 5 Drawing Sheets

(56) References Cited

U.S. PATENT DOCUMENTS

| | | | |
|---|---|---|---|
| 2018/0084542 A1* | 3/2018 | Fujishiro | H04L 1/1812 |
| 2018/0206213 A1 | 7/2018 | Kim et al. | |
| 2018/0316480 A1* | 11/2018 | Ohta | H04L 5/0053 |
| 2019/0182896 A1* | 6/2019 | Shrestha | H04W 72/56 |
| 2019/0387577 A1 | 12/2019 | Parron et al. | |
| 2021/0105101 A1* | 4/2021 | Wei | H04L 5/0055 |
| 2021/0307110 A1* | 9/2021 | Ramalingam | H04W 72/21 |

OTHER PUBLICATIONS

"Proposed Text for Connection Management C80216m-09 0633",IEEE Draftt C80216M-09 0633, IEEE-SA, Piscataway, NJ USA,—vol. 802.16m, Mar. 3, 2009 (Mar. 3, 2009),pp. 1-5, XP017611676.

Ramesh C et al.: "A novel MAC scheduling algorithm for TCP throughput improvement in LTE system" 2018 15th IEEE Annual Consumer Communications & Networking Conference (CCNC), IEEE, Jan. 12, 2018 (Jan. 12, 2018), pp. 1-4, XP033331879.

IP Wireless: "Benefits of IP-aware scheduling",3GPP Draft; S2-070759-IP Aware Scheduling, 3rd Generation Partnership Project (3GPP), Mobile Competence Centre ; 650, Route Des Lucioles ; F-06921 Sophia-Antipolis Cedex ; FRANCE, vol. SA WG2, St Louis, Missouri, USA; Feb. 7, 2007, Feb. 7, 2007 (Feb. 7, 2007), XP050258022.

Borman Quantum Corporation B Braden University of Southern California V Jacobson Google D et al.: "TCP Extensions for High Performance; rfc7323.txt", TCP Extensions for High Performance; RFC7323.TXT, Internet Engineering Task Force, IETF; Standard, Internet Society (ISOC) 4, Rue Des Falaises Ch-1205 Geneva, Switzerland,.

Mohammad Asharful Hoque et al.: "Saving Energy in Mobile Devices for On-Demand Multimedia Streaming—A Cross-Layer Approach" ACM Transactions on Multimedia Computing Communications and Applications, Association for Computing Machinery, US, vol. 10, No. 3, Apr. 17, 2014 (Apr. 17, 2014) pp. 1-23, XP058046487, ISSN: 1551-6857, DOI: 10.1145/2556942.

* cited by examiner

TCP ACKNOWLEDGMENT LATENCY OPTIMIZATION

CROSS-REFERENCE TO RELATED APPLICATIONS

The present application claims the benefit of U.S. Provisional Patent Application No. 63/002,591, filed on Mar. 31, 2020, which is incorporated by reference herein in its entirety.

BACKGROUND OF THE DISCLOSURE

1. Field of the Disclosure

The present disclosure relates to systems and methods for improving network latency for Radio Access Networks (RANs), and relates more particularly for $4^{th}$-Generation (4G) and $5^{th}$-Generation (5G) based mobile networks.

2. Description of the Related Art

Network communication latency characteristics, which are measured using Transmission Control Protocol (TCP) application latency and Packet Internet Grope (PING) application latency, are key performance indicators (KPIs) for network operators. Therefore, reducing these latencies is important to improving the network operation. In one example step, the PING application latency can be optimized, and Transmission Control Protocol Acknowledgment (TCP ACK) latency can be optimized in another example step, and the TCP optimization will in turn increase the download speed, thereby providing a complete solution to the latency issue in the network. The present disclosure is focused on optimizing the TCP ACK latency issue.

The TCP ACK latency issue is due to two factors: i) one factor is the user equipment (UE) time to access the network in uplink (UL) (by sending Scheduling Request (SR), UL grant for Buffer Status Report+Power Headroom Report (BSR+PHR), followed by UL grant for transmission of UL Data); and ii) the second factor is due to the stale PHR (as there are no proactive allocations for inactive UEs for PHR transmissions). FIG. 1 illustrates the delay introduced in the UE side (shown as 101) to access the network (shown as 102).

Regarding the two factors described above, when there is no UL data transmission happening from a UE, the UE doesn't have a UL grant to request for more UL grants (e.g., to send TCP ACK) by sending a BSR. Instead, the UE has to send SR in the Physical Uplink Control Channel (PUCCH) to get the UL grant to send the BSR, which process introduces a delay in the UE side to access the network (to access the network as soon as possible once the TCP ACK is ready in the UE media access control (MAC) layer to be transmitted in the Air). In addition, the UL grant given by evolved node B (eNB) in response to SR is given without any recent PHR report (as there is no UL data transmissions in the air (i.e., over a wireless interface) during UL inactivity, typically the PHR reports are piggy-backed along with UL data transmissions by a UE when the UL data transmissions occur), so the Modulation and Coding Scheme (MCS) and transmit power command (TPC) for the UL grant needs to be conservative, as there is no exact information available from the UE to decide on this.

Known attempts to improve the TCP ACK latency issue are complex and incomplete. For example, one known approach utilizes i) SR-based time estimation to find the TCP ACK packet arrival, and ii) ACK size estimation based on the TCP window size, which approach is complex and not robust. Therefore, there is a need for an improved technique for solving the TCP ACK latency issue.

SUMMARY OF THE DISCLOSURE

The present disclosure focuses on a method to reduce the latency of TCP flow and increase the TCP throughput, thereby providing improved quality of experience (QoE) for network users.

In an example method according to the present disclosure, in order to reduce the transmission control protocol acknowledgment (TCP ACK) latency, e.g., in 5G New Radio (NR) or LTE system, the example method is triggered only for user equipments (UEs) with uplink (UL) inactivity, i.e., Evolved Node B (eNodeB or eNB) missed at-least two or more Power Headroom Report (PHR) cycles (periods) from a UE. The example method reduces the TCP ACK latency by more than 11 ms when compared to existing 3GPP-standard-based UE network access schemes, with SR periodicity of 20 ms. In the case of High Capacity cells, the SR periodicity will be increased to support more capacity, e.g., the SR periodicity will go to 80 ms, which will increase the TCP ACK latency significantly, so the example method according to the present disclosure significantly reduces the TCP ACK latency in these scenarios.

In an example embodiment according to the present disclosure, the time estimation to find the TCP ACK packet arrival is based on estimation time split up in the UE side. In addition, in an example embodiment according to the present disclosure, TCP ACK size estimation is based on the number of TCP data packets sent in Physical Downlink Shared Channel (PDSCH). Furthermore, in an example embodiment according to the present disclosure, the first "proactive allocation window" (the number of the transmission time intervals (TTIs) over which the proactive allocations are given to UE) is set to 4, and subsequently the "proactive allocation window" may be adapted based on learning.

In an example embodiment according to the present disclosure, proactive allocation is enabled for the first TCP ACK packet, which is not possible with the known techniques that provide proactive allocation starting with the second TCP ACK packet.

In an example embodiment according to the present disclosure, for UL synchronized HARQ in LTE based systems, "HARQ Feedback" is addressed in the proactive allocation. In addition, error cases are addressed, e.g., when the data in proactive allocation is received with error. The above scenarios are similarly handled for 5G New Radio (NR) based systems also, for asynchronous UL HARQ.

DETAILED DESCRIPTION

TCP ACK/NACK Transmission

Figure 1:
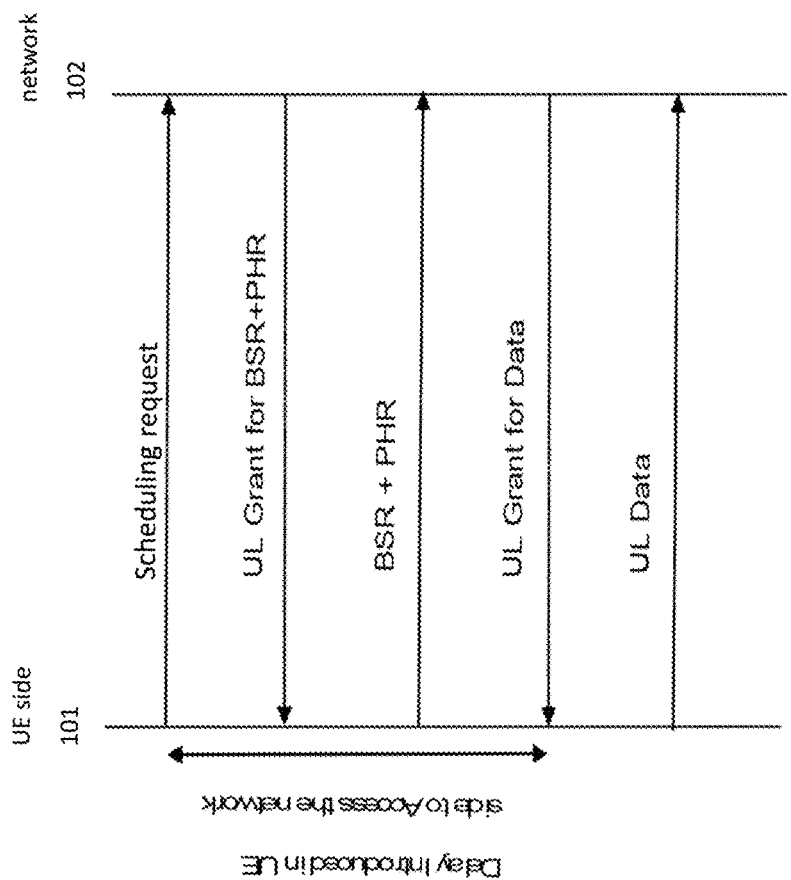
FIG. 1 illustrates the delay introduced in the UE side to access the network.

In most of TCP implementations, for every two TCP packets, a TCP receiver sends an acknowledgment (ACK). For each one TCP packet in error, the TCP receiver sends a negative acknowledgment (NACK) immediately. Even though the TCP transmitter window resizes as per ACK/NACK received, that will not change the above ACK and NACK transmission logic.

The TCP transmitter need not wait for an ACK for the transmitted TCP packets, and the TCP transmitter can continue the TCP data transmissions beyond the previously send two packets, until the TCP window size is reached (at which point it is forced to pause sending and wait), because the concept of "for every two TCP data packets one ACK" is not a hard rule like Stop-and-Wait protocol. The TCP can come in a burst, depending on the priority that UE can give to TCP ACK in uplink (UL).

Because of the round-trip time required between the TCP packet to be initially sent by the TCP transmitter and the TCP ACK to be received, there is a latency in the acknowledgement, i.e., the acknowledgment appears to be "late." The TCP sender is able to send N~ segments in the time it takes for the first segment to reach client and for the client's ACK to reach the server.

The TCP protocol is a feedback-driven protocol where the sender sends parts of the data and then waits for the receiver to send TCP ACK (indicating that the sent data is received) before sending more data. For each TCP ACK that is received, more data is subsequently sent than the amount of data that was acknowledged by the TCP ACK. This leads to a "slow start" behavior of TCP, where the data rate is increased dependent on the acknowledgement rate. If the UE is starting up a TCP download, it is important to transmit the TCP ACKs in the uplink as fast as possible during the "slow start" phase, but it is very hard to predict (e.g., even with deep packet inspection) exactly when the ACKs will be ready since that is affected by UE implementation and processing load.

In the slow start algorithm, the congestion window is increased by one segment every time an ACK is received. This increases the size of the sender's window in an exponential manner until a congestion is experienced. In this phase, the behavior is strongly dependent on the TCP Round Trip Time (RTT), i.e., the time interval between sending of the TCP data and receiving the TCP ACK for this data.

From the perspective of the Centralized Unit (CU), the TCP ACK may come in a burst. If the DL TCP data packets are sent in Air as a burst (even the arrival of TCP data packets from TCP server will also come in a burst) in a TTI, then the TCP ACK in the UL will also come in burst.

In the case of TCP ACK transmissions occurring within continuous TTIs, a TCP ACK transmission may occur in a particular TTI which is to satisfy a Buffer Status Report (BSR) from a UE in a previous TTI that was unable to be serviced.

If the UE is using the BSR in the previous UL transmission to get UL grant for transmitting TCP ACK, instead of using scheduling request (SR)/BSR flow, then the TCP ACK latency will be less.

Figure 2:
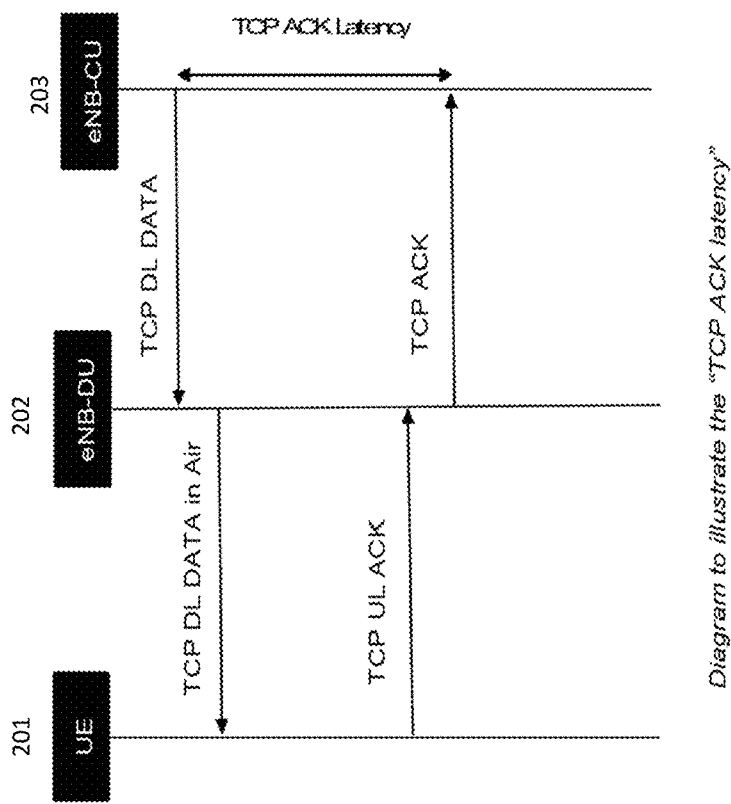
FIG. 2 illustrates the TCP ACK latency.

The TCP ACK latency is calculated from the time the first TCP data packet is sent from the TCP server to the time the TCP ACK is received in the TCP server, in which time period the second TCP data packet transmission from the TCP server also occurs. The TCP ACK latency is illustrated in FIG. 2, which shows the transmissions of TCP DL data, TCP UL ACK, and TCP UL involving UE 201, eNB-DU 202 and eNB-CU 203.

Use of "TCP ACK Latency" Parameter

Whenever the TCP data packets are sent in Air, it is necessary to track the TCP data packets and the corresponding TCP ACKs for the TCP data packets, in order to implement the TCP ACK latency-based optimization technique.

The TCP Data packets have the following characteristics: i) can come as a burst of packets in DL; ii) depend on DL Scheduling Delay; and iii) in case of multiple DL TCP sessions running in parallel, tracking the TCP sessions becomes complex.

There are several advantages of using TCP ACK latency-based optimization technique compared to other existing techniques. First, by tracking the number of TCP data packets sent per TTI, the number of TCP ACKs expected in UL can be calculated, and this advance knowledge of the expected number of TCP ACKs enables allocation of the UL grant size corresponding to the expected number of TCP ACKs. The method to track the number of TCP data packets sent per TTI are explained in further detail below.

Another advantage of using TCP ACK latency-based technique is that by tracking the TTI from which the TCP data packets are sent in air (i.e., wireless interface), the DL scheduling delay which impacts latency is avoided, and one can track the TCP arrival. In this case, the latency includes the SR periodicity, UE processing time and TCP application response time. The method to track the number of TCP data packets sent over a wireless (air) interface is explained in further detail below.

Yet another advantage of using TCP ACK latency-based technique is that, in case of multiple DL TCP sessions running in parallel, it is not necessary to track the TCP sessions, yet one can still use the TCP ACK latency-based optimization technique described herein.

The above-listed advantages make the TCP ACK latency a more desirable parameter to consider for the technique described herein.

RLC Status PDU

In the typical LTE eNB operation, the polling bit is set for every fourth PDU, so every fourth Protocol Data Unit (PDU) UE will send the Radio Link Control (RLC) STATUS PDU with an Acknowledgement Sequence Number (ACK SN). The ACK_SN field indicates the SN of the next un-received RLC Data PDU which is not reported as missing in the STATUS PDU. There is no need to provide separate UL grant to RLC Status PDU, because it is not a blocking factor, and the in-sequence RLC PDUs will be delivered to Packet Data Convergence Protocol (PDCP) regardless of whether or not the RLC Status PDU is sent, in UE side.

TCP Sessions

Even though there is only one default radio bearer using Acknowledgement Mode (AM) in the typical LTE eNB operation, we can have multiple active TCP sessions within the radio bearer, and each session will have separate sequence number, window size and ACK/NACK transmissions. In this case, however, the RLC status PDU is for the combined TCP sessions, and there will not be separate RLC Status PDU for each TCP session.

TCP Sessions Start and Stop

When the TCP "SYN" packet is received from the eNodeB and the three-way handshake is successful, then a TCP session is started. The source and destination IP addresses and TCP port numbers will be stored to track a session. When the TCP "FIN" packet is received from the eNodeB for the tracked session's IP addresses and TCP ports, the session is finished. Alternatively, one can track the IP header, the source IP address, the destination IP address, and the Protocol field, which should be TCP. The IP addresses ensure that there is a DL TCP data between the eNodeB and the UE.

TCP ACK/NACK Latency Reduction

In order to reduce the transmission control protocol acknowledgment (TCP ACK) latency, e.g., in 5G New Radio (NR) or LTE system, the following scheme is triggered only for user equipments (UEs) with uplink (UL) inactivity, i.e., eNodeB missed at-least two or more Power Headroom Report (PHR) cycles (periods) from a UE.

When the first TCP/Internet Protocol (IP) Data Packet is received in eNB PDCP layer, from a UE which has not sent the PHR for many cyclical periods and has been inactive, the eNB Packet Data Convergence Protocol (PDCP) layer, after decryption, can detect what type of packet is received from UE, by checking the TCP/IP header, and subsequently send the information to a distributed unit (DU) along with the data. When the TCP Synchronize (SYN) packet is received from the eNodeB and the three-way handshake is successful, then a TCP session is started. The Source and destination IP addresses and TCP port numbers will be stored in a central unit (CU) to track a session. Alternatively, the CU can track the IP header, Source IP address, the Destination IP address, and the Protocol field, which should be TCP. The IP addresses ensure that there is a downlink (DL) TCP data between the eNodeB and UE. Even though the UE can have multiple TCP sessions, the example embodiment of the latency-optimization method described herein will provide only one proactive allocation window per UE.

There are two components to this example embodiment of the method, "delay timer" and "proactive allocation window." The delay timer is to delay the start of the proactive allocation window from the transmission time interval (TTI) in which the packet type is detected. The proactive allocation window is the number of TTIs over which the proactive allocations are given to a UE. For example, if there are 4 allocations continuously spread over 4 TTIs, then the proactive allocation window size is 4 TTIs. This proactive allocation window size and start time are tuned in each step (e.g., for each TCP ACK received).

Figure 3:
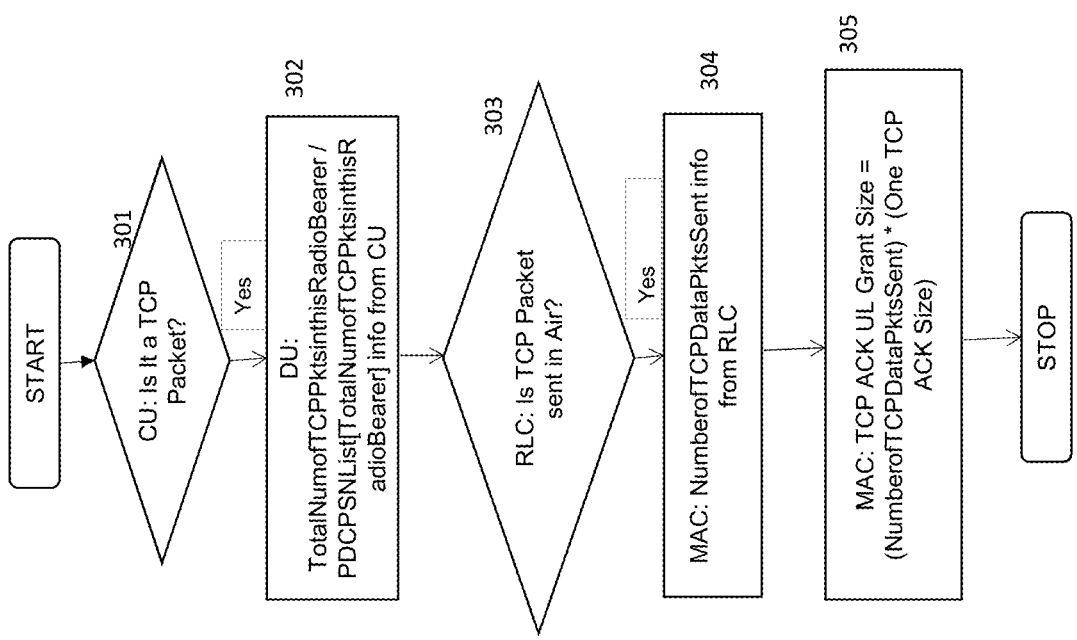
FIG. 3 is a flowchart illustrating an example embodiment of the TCP ACK/NACK latency reduction method

FIG. 3 is a flowchart illustrating an example embodiment of the TCP ACK/NACK latency reduction method according to the present disclosure. In block 301, the CU determines whether a TCP data packet has been detected. If yes, in block 302, along with the TCP data packets in the midhaul, the CU will provide to DU the TCP packet detection information, which contains the parameters i) "TotalNumofTCPPktsinthisRadioBearer" (which parameter is to indicate to the DU that there are DL TCP data packets in CU, i.e., this is TCP-packets-aware CU counter), which count will be stored in DU, and ii) PDCPSNList[TotalNumofTCPPktsinthisRadioBearer], which contains the list of TCP Packets PDCP header SN (sequence numbers). Whenever the Medium Access Control (MAC) does the Buffer Occupancy (BO) Request in a TTI to the Radio Link Control (RLC), the MAC gets the "NumberofTCPDataPktsSent" parameter from RLC (to take care of RLC concatenation and segmentation of TCP data packets, RLC will not include the segmented TCP packets in this count, since this is TCP-packets-unaware DU counter). The RLC will check the PDCP SN in the header and increment the parameter (NumberofTCPDataPktsSent) only for the PDCP SN in the PDCPSNList[TotalNumofTCPPktsinthisRadioBearer].

The need for the use of PDCPSNList is explained here briefly. Because in the default bearer both UDP and TCP traffic will flow together, when the present method is active for a DL TCP traffic flow, if the DL UDP traffic also starts, then we need to be able to differentiate between TCP and UDP flow to allocate UL grant for the TCP ACK. With the TCP PDCP SN list, it is made possible to segregate the TCP packets in the DU and count.

Once the MAC gets the parameter from the RLC, it decrements the CU parameter, TotalNumofTCPPktsinthisRadioBearer=(TotalNumofTCPPktsinthisRadioBearer)−(NumberofTCPDataPktsSent).

In each TTI, the order of parameter checking in the MAC layer is as follows: i) first, the "TotalNumofTCPPktsinthisRadioBearer" is checked, and if it is received, it will be replaced with new value; and ii) second, the parameter "NumberofTCPDataPktsSent" will be checked only in the TTI in which the particular UE (i.e., DL TCP data active) is scheduled. "TotalNumofTCPPktsinthisRadioBearer" parameter will be specific for a particular DL TCP session we are tracking as part of this TCP ACK latency optimization technique.

After the packet detection information from CU is received at DU at block 302, the first set (e.g., one or more) of TCP data packet is transmitted in air (wireless interface) in DL, and RLC determines at block 303 whether the TCP data packet is transmitted in air. At this point, the MAC needs to allocate proactive UL allocations (which allocation involves blocks 304 and 305 shown in FIG. 3) and start a timer for delay timer #1. When the TCP packet is transmitted in air, the MAC notes the following information: Transmitted_System Frame_Number (SFN); and NumberofTCPDataPktsSent information received from the RLC (in block 304). Delay timer #1 can be represented as follows:

Delay Timer #1="UE feedback for DL data"+"TCP App ACK response"+"UE UL Application and L3 process". For example, the Delay Timer #1=(4 ms+2 ms+2 ms)+2 ms headroom=10 ms. This is merely an example, and the delay timer components can be optimized based on testing. The first component (UE feedback for DL data) is for DL data UE needs to send the HARQ feedback, e.g., 4 ms, which includes the time to send the TCP data to UE TCP APP. The second component (TCP App ACK response) is for TCP APP to response with TCP ACK, e.g., 2 ms. The third component (UE UL Application and L3 process) is for UE Application/protocol stack processing time and time in which it will be available in MAC layer, e.g., 2 ms.

When the delay timer expires, a proactive allocation window of size four is started, with four UL allocations with a 10 ms gap, except for the first UL grant for which the Delay Timer acts as a gap. The UL grant (e.g., at block 305 in FIG. 3) will be of size (NumberofTCPDataPktsSent*TCP_ACK_SIZE)+size of BSR+size of PHR. TCP_ACK_SIZE can be 52 bytes size for TCP ACK with a timestamp field, otherwise it is 32 bytes. In the proactive allocation, if BSR is received along with data, then the proactive allocation window will be stopped and the eNB will immediately provide the UL grant of the size requested in BSR, in the subsequent TTIs.

The method according to the present disclosure does not enable starting a delay timer for each two TCP data packets and allocating a proactive grant, and sometimes the TCP ACK will come in a burst, in which case there will not be one-to-one mapping between the TCP data packet sent and the TCP ACK. This means the TCP ACK latency is quite variable, e.g., from 27 ms to 51 ms, and it'll be very costly to match the two TCP data packet and the corresponding TCP ACK. Therefore, for each burst of TCP data packets, it is necessary to track the TCP ACK (UL) using a delay timer.

If there are multiple TCP data packets waiting in DL, and the eNB is not able to clear the data packets in the same TTI, the eNB will schedule the data packets in the subsequent TTIs. In the case of a relatively less loaded cell, the scheduling can happen immediately or after a short interval, but in the case of a heavily loaded cell, the scheduling will happen after a delay gap. There is no need to track the TCP data burst which is scheduled immediately or after a short interval. Therefore, the below condition is applied:

If ((Current Transmitted_SFN/Subframe_Num)~(Previous Transmitted_SFN/Subframe_Num)>DELAY_THRESHOLD) track the TCP ACK, start delay Timer;

Else, don't start delay timer, no need to track the TCP ACK for the TCP data burst.

For example, the DELAY_THRESHOLD can be 5 ms, UE feedback for DL data=4 ms, which includes the time to process and send to UE TCP APP, so the TCP data bursts received with 5 ms interval will be split into two different TTIs to transmit in UL, because of the gap between them.

When the delay timer expires, a proactive allocation window of size four is started, with four continuous UL allocations. The UL grant will be of size "NumberofTCPDataPktsSent*TCP_ACK_SIZE." Next, the above-described blocks 301 and 302 illustrated in FIG. 3 (relating to packet detection information) are repeated.

When a particular UE (DL TCP data active) is scheduled in the TTI for a second set of TCP data burst and the TCP packet is transmitted in air (wireless interface), DU detects and notes i) the Transmitted_SFN/Subframe_Num, and ii) whether TCP data packets have been received in the previous proactive allocation window. Now there will be a new delay timer for a proactive allocation window start, as follows:

If "TotalNumofTCPPktsinthisRadioBearer>0" is true (yes),

Delay Timer #2=("UE feedback for DL data"+"TCP App ACK response"+"UE UL Application and L3 processing"+X)+Start Delay Offset("proactive-allocation-data-received-index"−"proactive-allocation-window-start-index").

X=if (proactive-allocation-data-received-index==1) {DT #1_HEADROOM}else {0}

If the "proactive-allocation-data-received-index" is one, this means the UE is able to catch up to the first proactive allocation itself. In this case, the allocation window needs to be advanced further in an attempt to additionally reduce latency, i.e., the proactive allocation (PA) window is advanced further to "DT #1_HEADROOM" offset to compensate for the 2 or 3 TTI gap that was incorporated in the PA Window #1.

The "Start Delay Offset" is to compensate for the timing mismatch between the first proactive allocation in the window and the actual proactive allocation in which the data is received. For example, if there are 4 proactive allocations in the window, and the data (PUSCH) is actually received for the corresponding third allocation (DCI0), the delay timer needs to be advanced further by two TTI to sync with UE TCP ACK timing. In the above example, DCI0 will be in the 3rd TTI in the proactive allocation window, and PUSCH will be in 7th TTI in the window, so the "proactive-allocation-data-received-index"=3 (not 7), which takes care of the 4 TTI delay between DCI0 and PUSCH transmission, and the "proactive-allocation-data-received-index" variable points the UL grant (DCI0) index in the proactive allocation window, not the PUSCH. In this example, Start Delay Offset=(3-1)=2, so the delay timer #2 will be added with 2 ms, so the first proactive allocation (PA #1) will start two milliseconds later compared to the delay timer #1. When the delay timer #2 ends, proactive allocation window of size four is started, with four UL continuous allocations. The UL grant will be of size "NumberofTCPDataPktsSent*TCP_ACK_SIZE." Next, the above-described blocks 301 and 302 illustrated in FIG. 3 (relating to packet detection information) are repeated.

The delay timer #2 will be used when the second set of TCP data burst is sent, and this cycle of delay timers (delay timer #s1 through N) is performed continuously. This continuous cycle of delay timers (including the already started latest delay timer) will be stopped if i) the CU detects there is no TCP ACK is received, or ii) when the DU detects padded data in all four proactive allocations.

When a particular delay timer ends, the corresponding proactive allocation window will be started, and there will be "W" UL allocations in the window. All "W" allocations are continuous, so it will cover "W" TTIs (which represent the "window size"). The "W" value is indicated by "proactive-allocation-data-received-index," e.g., in the above example the "proactive-allocation-data-received-index" value is 3, so the W size is 3.

This functionality to tune the delay timer and the window size will be repeated for all other subsequent TCP data bursts transmissions in air (wireless interface). In the next or subsequent TCP ACK transmission occasion, the proactive allocation window size will become one, i.e., there will be only one proactive allocation which is matching with TCP ACK timing.

Some of the additional conditions applied in accordance with the method of the present disclosure are listed below. When TCP data packets are not received in eNodeB for at least 1 second (threshold), then the method according to the present disclosure stops the delay timer and the proactive allocation window. In the case of retransmission of the first set of TCP data packet (which means UE sent a negative acknowledgment (NACK) feedback), the first proactive UL allocation window will not be started, and the delay timer will be cancelled. In case the TCP ACK packet size is large, e.g., 1024 bytes, then the eNodeB can provide a proactive allocation of only half the size. The UE will segment the TCP ACK and send in two TTIs using two proactive allocations, in which case there will be a minimum of two proactive allocations in the window. In case there is no TCP ACK, and instead a SR from the UE is sent, the delay timer is stopped. As an example, if the maximum mid-haul delay is 6 msec, it will take at least 7 msec to get the information whether the packet is a TCP or not in the MAC layer. In this case, when it is detected that the packet is a TCP data packet request in PDCP, the "packet detected info" is sent to the MAC, and by the time the TCP data packet arrives at the CU (accounting for the midhaul latency), the "packet detected info" will be received at the MAC.

Figure 4:
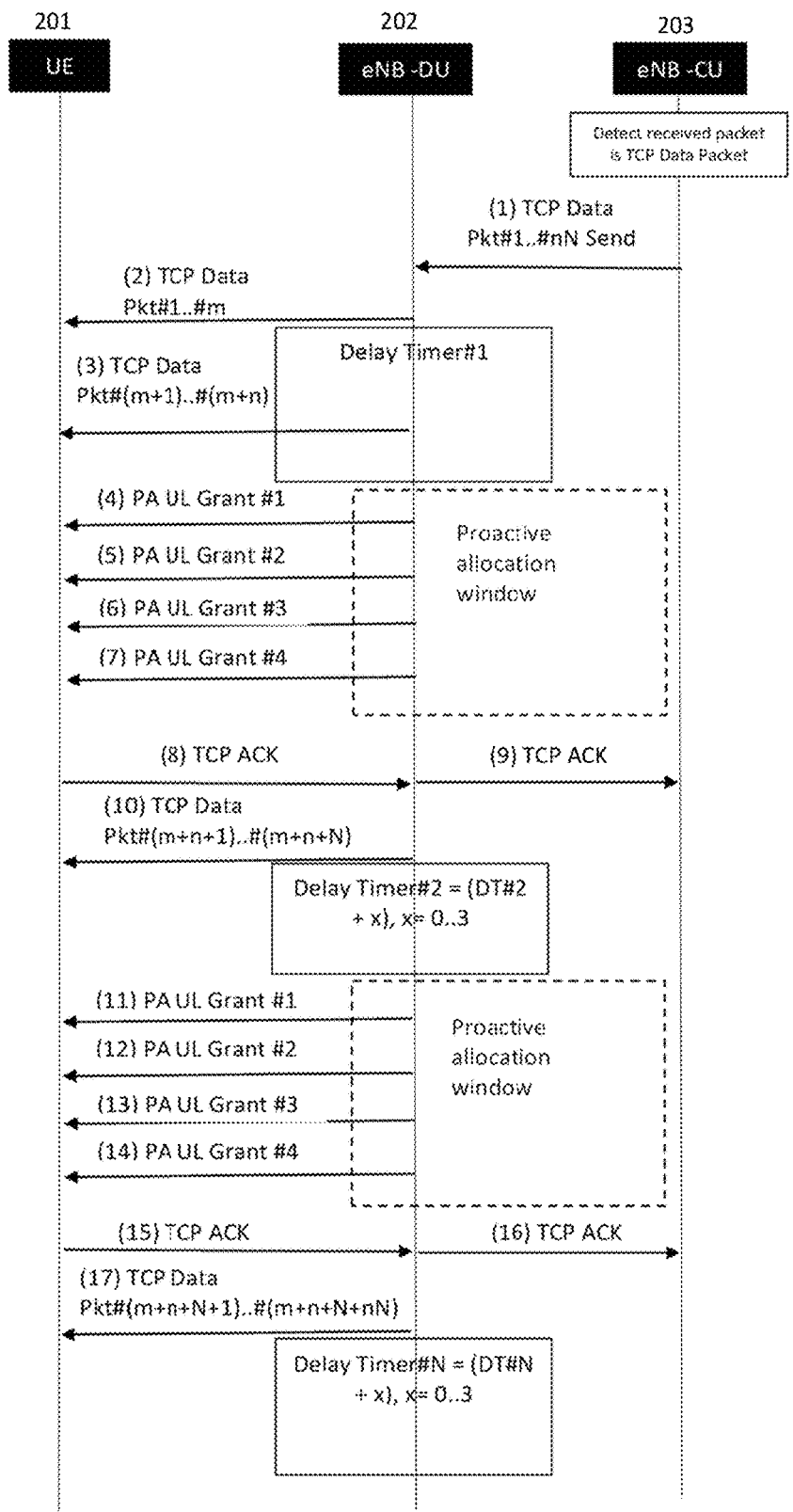
FIG. 4 illustrates an example method according to the present disclosure.

FIG. 4 illustrates an example method according to the present disclosure. In Step 1, CU 203 detects the TCP session is active, either i) when TCP three-way handshake occurs or ii) when the TCP traffic is flowing, which detection can be done by checking the TCP/IP Header, as explained in detail above. Step 1 will be performed for only the UL inactive UEs. In Step 2, the packet detection information is received at DU 202, as indicated by the process arrow "(1) TCP Data Pkt #1 . . . #nN Send" shown in FIG. 4, and the packet detection information is stored for the corresponding logical channel. In Step 3, if the TCP data packet from the corresponding logical channel for which the packet detection information is stored is transmitted in the air, as indicated by the process arrow "(2) TCP Data Pkt #1 ... m" shown in FIG. 4, DU i) detects and records the System Frame Number (SFN)/Subframe Number (SF), and ii) starts the Delay Timer #1 (e.g., the value can be 10 ms). In Step 4, if there are one or more DL transmissions in the air from the same logical channel, e.g., as indicated by the process arrow "(3) TCP Data Pkt #(m+1) ... #(m+n)" shown in FIG. 4, the Delay Timer #1 would be normally started again for each transmission in the air. However, there is an exception, as previously explained above: if the gap between the two transmissions is less than a predetermined threshold, we do not need to start the Delay Timer #1 for those transmissions, and the special condition to handle this case (as explained above) is applied. FIG. 4 illustrates this exception scenario, i.e., after the first delay timer (e.g., Delay Timer #1) is started, the next set of TCP packets are transmitted in the air, and for those transmissions the delay timer is not started.

Continuing with the method shown in FIG. 4, in Step 5, when the first delay timer (Delay Timer #1) ends, the proactive allocation window is started with proactive allocation grants (as indicated by the process arrows "(4) PA UL Grant #1", "(5) PA UL Grant #2", "(6) PA UL Grant #3", and "(7) PA UL Grant #4" shown in FIG. 4), and the UE will use any one of these proactive allocations to transmit to the DU 202 the TCP ACKs as a burst or a single ACK, as indicated by the process arrows "(8) TCP ACK", and the DU 202 will transmit "(9) TCP ACK" to the CU 203, as shown in FIG. 4. In Step 6, when the Delay Timer #2 is started for the next set of TCP data transmission in the air, as indicated by the process arrow "(10) TCP Data Pkt #(m+n+1) ... #(m+n+N)" shown in FIG. 4, the delay timer (Delay Timer #2) will be adjusted based on the learning from the previous proactive allocation window, as previously described above. Once the delay timer (Delay Timer #2) ends, the proactive allocation window is started, as indicated by the process arrows "(11) PA UL Grant #1", "(12) PA UL Grant #2", "(13) PA UL Grant #3" and "(14) PA UL Grant #4" shown in FIG. 4, and the UE will use any one of these proactive allocations to transmit the TCP ACKs as a burst or a single ACK, as indicated by the process arrows "(15) TCP ACK" and "(16) TCP ACK" shown in FIG. 4. Step 6 will be repeated (e.g., starting with the step as indicated by the process arrow "(17) TCP Data Pkt #(m+n+N+1) ... #(m+n+N+Nn)" shown in FIG. 4) for each new transmission from the logical channel. This procedure ends when the session ends or when the UL traffic starts and reception of PHR in periodic interval starts. As used in FIG. 4, m, n and N are integers.

Figure 5:
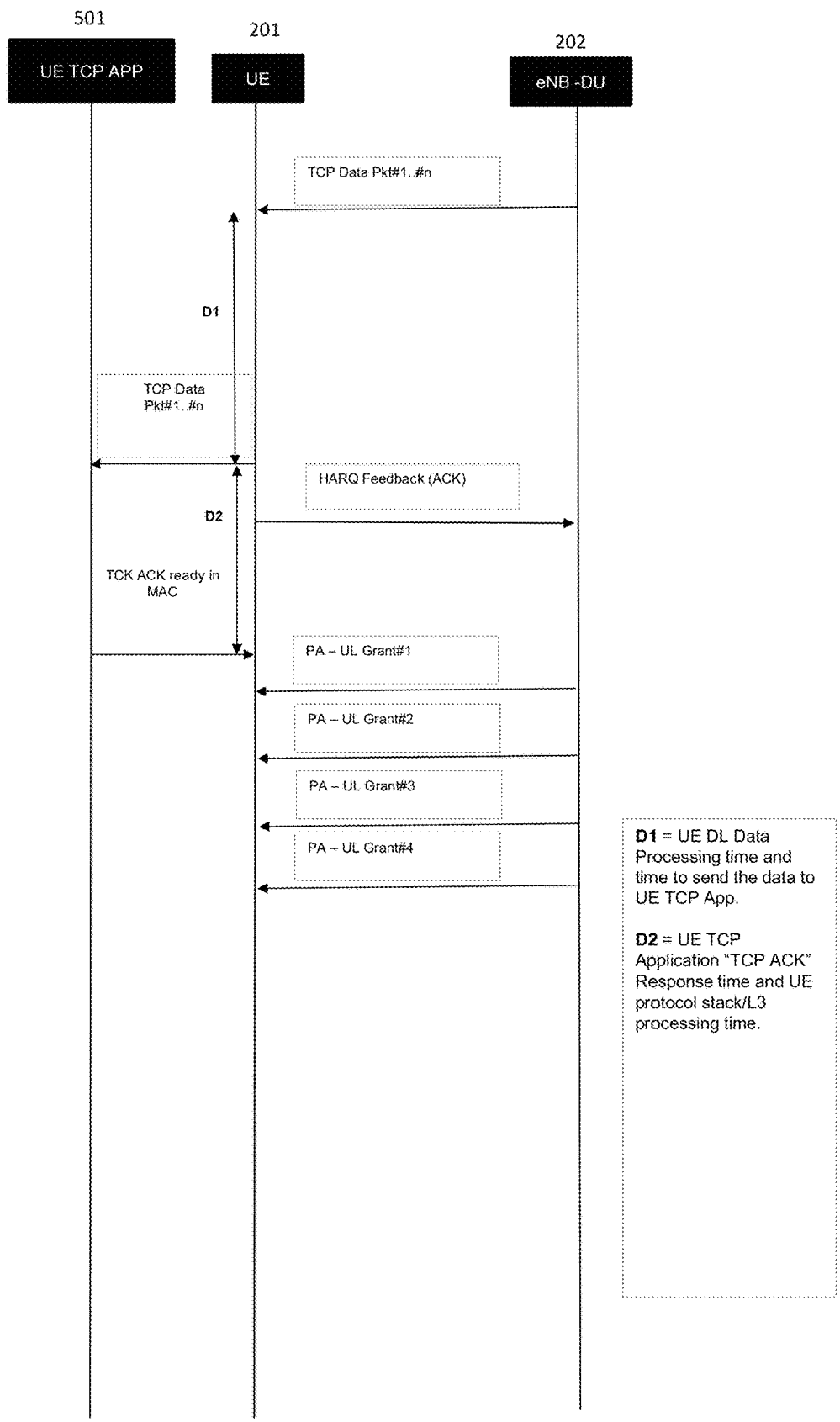
FIG. 5 illustrates the two components of the delay timer.

FIG. 5 illustrates the two components of the delay timer, e.g., components D1 and D2, in the context of various communications among UE 201, DU 202 and UE TCP Application (App) 501. D1 includes UE DL Data Processing time and the time to send the data to UE TCP App 501. D2 includes UE TCP Application "TCP ACK" response time and UE protocol stack/L3 processing time.

TCP NACK Handling

When a TCP packet is received with an error on the UE side, the UE will send TCP NACK for each TCP packet with an error. The proactive UL grant given for TCP ACK is sufficient for transmitting TCP NACK, so it is not necessary to provide a separate proactive allocation for TCP NACK. When the TCP NACK is received by the TCP sender, the TCP sender window will be adjusted, but this adjustment will not impact the present method, which is based on the number of TCP packets transmitted in air.

Example Scenarios Handled

In an example embodiment of the method according to the present disclosure, one TCP session per radio bearer is handled, so in case there are multiple TCP sessions, the method will not be applied for all the TCP sessions at once. For example, the method is applied for the first TCP session, and if two additional TCP sessions are started in the same default bearer during the first TCP session, the method will not be applied for those two additional sessions. Once the first TCP session is ended, the method is applied to the second TCP session.

Even though the logic for the example embodiment of the method is applied for one TCP session at a time in a radio bearer, the functionality to provide the proactive allocation window for the TCP ACK works for all TCP data packets in DL (including all the DL TCP sessions). Another way of saying the logic is applied for one TCP session is that the CU will maintain TCP related information (Source/Destination IP, Source/Destination IP) for one session only (for the very first DL TCP session started), and the CU will not track all sessions in the radio bearer.

Overcoming Stale PHR Issue:

In an example embodiment of the method according to the present disclosure, there will not be any separate proactive allocation for the PHR transmissions. The UL allocation given for TCP ACK for the SYN_ACK is sufficient for the other proactive allocation windows. For continuous DL TCP data traffic, there will be periodic UL traffic for the TCP ACK. Because the TCP ACK latency can reach, e.g., 50 ms, in a fully loaded cell, so in this case the UL grant will be given each 50 ms, and the UE will have a chance to send the PHR.

Discussed below is how to handle the stale PHR issue in the following case: the UL data traffic stops while the DL TCP flow is proceeding for a UE, and after a few PHR misses the method according to the present disclosure is enabled. In this scenario, for the first TCP data burst, the conservative MCS will be used for the proactive allocation. Along with first TCP ACK received in the proactive allocations, the PHR will be received, which PHR will be used for subsequent proactive allocation windows.

UE Reaction to Multiple Proactive Allocations

In case there are multiple allocations for the UE in the UL proactive allocation window and the UE is going to use only one (for example, out of 4 allocations, the UE chooses to use the fourth allocation grant), an example reaction of the UE for the other allocations is as follows: If there is no data in UE to send, then the UE will send padding data (with padding LCID) without BSR, and if it's a PHR occasion or the previous PHR occasion was missed, the UE will transmit the PHR.

HARQ Processes and Synchronous HARQ in UL:

In UL, synchronous HARQ is used, which means the same specific HARQ process is repeated in a specific subframe, i.e., UE must use the same HARQ process number every 8 subframes (FDD RTT).

Example Case #1: All the proactive allocations in the allocation window will have DCI0 with RVO, so that eNB will not do the HARQ soft combining by mistake, e.g., when UE retransmits padded data due to wrong HARQ feedback decoding. In addition, eNB will not send NACK for the padded data sent by UE (with error) in the proactive allocation window.

Example Case #2: In the case of 4 allocations provided in the proactive allocation window, if the padding data transmitted by UE in any one allocation is in CRC error, and the eNB has already received the intended TCP ACK before the actual subframe in which the synchronous retransmission happens, then the eNodeB will not send NACK. For example, if the padding data in the first allocation (Alloc #1) in the allocation window is in CRC error, and i) the padding data continue to be received in the second and third allocations (Alloc #2 and Alloc #3) in the allocation window without BSR, and ii) in the fourth allocation (Alloc #4) the expected user data is received, then the eNB will send ACK as HARQ feedback. This is possible because the feedback for the Alloc #1 will be sent in the 8th subframe, by which time it is possible to decode the Alloc #4 and determine whether the expected user data is received or not.

Example Case #3: In the case of 4 allocations provided in the proactive allocation window, if the UE i) sends the padded data in the Alloc #1, ii) sends in Alloc #2 the actual data which is in CRC error, and iii) sends Alloc #3 and Alloc #4 with padded data, then the eNB will not be able to know whether the PUSCH received in Alloc #2 is padded data or the actual data. In this case, the window size will not be extended, thereby allowing the UE to recover from the error, send an SR and transmit a TCP ACK. This applies for all cases where one PUSCH (allocation) is in error out of four UL grants, and the remaining three are received successfully with padded data.

Example Case #4: This case is substantially similar to the Example Case #2, with the only differences being that the UE not able to catch up with the window size (4 allocations), and the last allocation is also padding data without BSR. This scenario is possible because, for Alloc #1 and Alloc #4, feedback will be sent in the 8th and 12th subframes, respectively, by which time it is possible to decode Alloc #4 and determine whether the expected user data is received or not, and send ACK as HARQ feedback for the padded data.

Example Case #5: In the case of 4 allocations provided in the proactive allocation window, if the data in all 4 allocations are in error, eNB will not be able to determine whether expected user data in one of the proactive allocations is in error. In this case, the window size will not be extended, thereby allowing the UE to recover from the error, send an SR and transmit a TCP ACK.

Outter Loop Rate Control (OLRC) Optimization

In an example embodiment of the method according to the present disclosure, when a padding data is received in the proactive allocation, the ACK response is not updated in the OLRC Step Up calculation. This is necessary because even for padding data with an error, the example embodiment of the method provides an ACK response instead of a NACK response, to reset the HARQ Process status to new. This is valid for the cases in which the data in all 4 proactive allocations are in error.

In another example embodiment of the method according to the present disclosure, if the intended data packet is received in the proactive allocation, HARQ process status and OLRC are active, and the ACK/NACK response will be updated in the OLRC Step Up and Step Down calculation. This is not valid for the cases in which the data in all 4 proactive allocations are in error.

UL Data During Active Delay Timer/Proactive Allocation

If UL data (any data traffic) arrives in the UE MAC layer when the delay timer is running, UE sends the SR/BSR flow to get the UL allocation to transmit the data. The delay timer will run its course and end. In the case the UE sends the BSR instead of TCP ACK in the proactive allocation, the proactive allocation window will be stopped. If i) UL data (any data traffic) arrives when the proactive allocation window is running, and ii) the UE sends the BSR instead of TCP ACK in the proactive allocation, the proactive allocation window will be stopped.

PING & UL Traffic

This section describes what happens when the PING is started when UL traffic is going on, and continues even after the UL traffic has stopped. In the case of TCP ACK transmission during UL traffic flow (PING or any other traffic), UE will send BSR in the UL grant given to the UL traffic flow and get the UL grant for TCP ACK transmission. In the case of TCP ACK transmission when the UL traffic flow has stopped, the BSR will not be sent by UE, but instead SR will be used to send TCP ACK (in the case of a burst of TCP ACK transmission, BSR will be sent along with SR). If there are continuous SR from the UE, then we can conclude the UE is doing only DL TCP traffic, not UL TCP traffic. The TCP ACK latency reduction method according to the present disclosure can be triggered for the UL TCP traffic.

Application to High Capacity Cells and Busy Hours

This section describes how an example embodiment of the method according to the present disclosure is applied to high capacity cells (e.g., 1,000 UEs) and during busy hours for the cells. When the DL TCP application is running for a given UE, the UE's UL traffic will be given higher priority in a high cell capacity handling module. Even in the case of the cell PRB utilization being high, the proactive allocation for the UE is still supported to reduce the TCP ACK latency and push out the DL TCP traffic as soon as possible from the system (by reducing the TCP ACK latency we can increase the TCP rate, and essentially reducing the TCP flow hold time in the cell).

5G NR vs. LTE

The example embodiment of the method according to the present disclosure is fully applicable to, e.g., 5G NR and LTE, as well as other standards. In the context of the method according to the present disclosure, there are two relevant techniques which are different in 5G NR compared to LTE: one is SR, and the other one is HARQ. The below-described changes to SR and HARQ refer to the changes needed for the 5G NR operation.

With respect to Scheduling Request (SR) in 5G NR, due to the multiple numerology/TTI type and the associated logical channel, changes in SR is required. The MAC entity can be configured with zero, one, or more SR configurations. An SR configuration consists of a set of PUCCH resources for SR across different BWPs and cells. For a logical channel, at most one PUCCH resource for SR is configured per BWP. Each SR configuration corresponds to one or more logical channels.

With respect to Code Block Group (CBG)-based HARQ feedback and re-transmissions, it should be noted that there can be a performance degradation of HARQ due to large TB size, and CBG-based feedback and re-transmissions are introduced to overcome the performance degradation. In the channel coding phase in the physical layer, code block segmentation and code block concatenation can be implemented in an example embodiment. The mobile terminal will send HARQ feedback for each of the individual groups of CBGs, and this granular level of feedback mechanism avoids the overhead of re-transmitting the large TB multiple times, which improves the spectral efficiency. In this manner, multiple-bits HARQ feedback is introduced to provide a feedback to multiple CBGs. Even the re-transmissions are of code block granularity. This CBG-based re-transmission and feedback feature is configurable and adaptive, i.e., for a small TB size the method according to the present disclosure can revert to the regular scheme.

With respect to UL HARQ, it should be noted that asynchronous and adaptive UL HARQ is supported in 5G NR, i.e., it functions with the multiple HARQ processes in any order, and there is no stipulated relationship between a specific HARQ process number a specific subframe. To keep track of each HARQ process even when multiple HARQ processes are not running in order, the sender and the receiver in the HARQ process should know the exact HARQ process number for each transmission/reception of the HARQ data. For this, DCI carries a field called HARQ Processor number. In 5G NR, both Downlink Scheduling DCI and Uplink Scheduling DCI carries the field HARQ Processor Number since they both use asynchronous HARQ.

In addition, there is no explicit HARQ ACK/NACK for PUSCH, and basically there is no PHICH channel. If gNB does not send a retransmission request for a certain period of time, UE assumes that PUSCH is successfully received and decoded by gNB. In this manner, UE figures out the PUSCH status based on whether it gets a retransmission request from gNB or not.

Applicability to 5G NR

As mentioned above, the example embodiment of the method according to the present disclosure is fully applicable to, e.g., 5G NR, albeit with some modifications. In this section, each one of the modifications specific to 5G NR application as described above will be further explained in terms of how much (if any) impact the modifications will have on the example embodiment of the method. First, the SR-related changes in 5G NR will not impact the example embodiment of the method according to the present disclosure. The UE needs to send the SR to access the network in UL, and this introduces the delay as previously discussed above. Second, the CBG-based feedback and re-transmission will have an impact on the example method according to the present disclosure. Once the packet is received with an error, the CBG-based feedback and re-transmission will be utilized. In this implementation, if the PUSCH received in the proactive allocation window is received with an error, then the eNB will react in a different way, and the corresponding gNB functionality will be defined as described below. Third, asynchronous UL HARQ and no feedback for PUSCH will have an impact on the example method according to the present disclosure, and the relevant changes are described below.

In UL, asynchronous HARQ is used in 5G NR, and described below are various scenarios in which the 5G NR system handles asynchronous HARQ.

Example Case #1: All the proactive allocations in the window will have DCI 0_0/0_1 with RVO, so that gNB will not do the HARQ soft combining by mistake. In addition, gNB will not send DCI0_0/0_1 with retransmission for the padded data sent by UE with error in the proactive allocation window.

Example Case #2: In the case of a proactive allocation window with 4 allocations, if the padding data transmitted by UE in any one of these allocations is in CRC error, and the gNB has already received the intended TCP ACK before the actual subframe in which the intended retransmission is supposed to be triggered by the gNB, then the gNB will not trigger the retransmission for that PUSCH. As an example, if i) the padding data in the first allocation (Alloc #1) in the allocation window is in CRC error, ii) the padding data in the second and third allocations (Alloc #2 and Alloc #3) in the allocation window are received without BSR, and iii) in the fourth allocation (Alloc #4) in the allocation window the expected user data is received, then the gNB will not retransmit the Alloc #1. This is possible because, for the Alloc #1, the timing of sending the trigger for retransmission depends on K2 parameter indicated in DCI, e.g., it can be the 8th subframe, by which time we can decode the Alloc #4 and determine whether the data is expected user data or not.

Example Case #3: In the case of a proactive allocation window with 4 allocations, if i) the UE sends the padded data in the first allocation (Alloc #1) within the allocation window, ii) in the second allocation (Alloc #2) within the allocation window the actual data is sent which is in CRC error, and iii) the third and fourth allocations (Alloc #3 and Alloc #4) within the allocation window are sent with padded data, the gNB will not be able to determine whether the PUSCH received in Alloc #2 is padded data or the actual data. In this case, the window size will not be extended, thereby allowing the UE to recover from the error and send an SR and transmit TCP ACK. This applies for all cases in which one PUSCH (Allocation) is in error out of four UL grants (allocations), and the remaining three UL grants (allocations) are received successfully with padded data.

Example Case #4: This case is substantially similar to the Example Case #2, with the only differences being that the UE not able to catch up with the window size (4 allocations), and the last allocation is also padding data without BSR. This scenario is possible because, for Alloc #1 and Alloc #4, the timing of the sending of the retransmission trigger depends on K2 parameter indicated in DCI, e.g., it can be the 8th and 12th subframes, respectively, by which time Alloc #4 can be decoded and determined whether the expected user data is received or not, and declare the padded data is successfully received.

Example Case #5: In the case of 4 allocations provided in the proactive allocation window, if the data in all 4 allocations are in error, gNB will not be able to determine whether expected user data in one of the proactive allocations is in error. In this case, the window size will not be extended, thereby allowing the UE to recover from the error, send an SR, declare all four PUSCHs are successful, and there will be no triggering of the retransmit DCI.

In summary, the above-described example embodiments provide various advantages as outlined below:

A first example method for reducing Transmission Control Protocol Acknowledgement (TCP ACK) latency by estimating a time of TCP ACK packet arrival in one of a 5G New Radio (NR) and a Long Term Evolution (LTE) system, comprising:

estimating a first delay timer (DelayTimer #1) as a sum of time for user equipment (UE) feedback for downlink (DL) data, time for TCP application ACK response, and time for UE uplink (UL) application and L3 process; and estimating a second delay timer (DelayTimer #2) as a sum of time for UE feedback for DL data, time for TCP application ACK response, time for UE UL application and L3 processing, time allotment for variable X, and time for Start Delay Offset parameter;

wherein X equals DelayTimer #1_HEADROOM offset if proactive-allocation-data-received-index equals 1, otherwise X equals zero;

whereby if the "proactive-allocation-data-received-index" is one, advancing a proactive allocation (PA) window to DelayTimer #1_HEADROOM offset, wherein the proactive allocation window is the number of transmission time intervals (TTIs) over which proactive allocations are given to the UE.

A second example method for estimating uplink (UL) grant size for a Transmission Control Protocol Acknowledgement (TCP ACK) size in one of a 5G New Radio (NR) and a Long Term Evolution (LTE) system, comprising:

computing a number of complete downlink (DL) TCP data packets transmitted in a Physical Downlink Shared Channel (PDSCH) in air; and multiplying the number of complete DL TCP data packets transmitted with the TCP ACK size, wherein the TCP ACK size varies depending on whether a timestamp field is included in the TCP ACK.

A third example method of tracking Transmission Control Protocol (TCP) data burst in a Physical Downlink Shared Channel (PDSCH) which is scheduled from Evolved NodeB (eNB) in downlink (DL), comprising:

determining whether a difference between a) at least one of a currently transmitted system frame number (Transmitted_SFN) and a subframe number (Subframe_Num) and b) at least one of a previously transmitted system frame number (Transmitted_SFN) and a subframe number (Subframe_Num) is greater than a predetermined delay threshold (DELAY_THRES); and i) if the determined difference is greater than the predetermined delay threshold, tracking Transmission Control Protocol Acknowledgement (TCP ACK) arrival time, by starting a delay timer, and ii) if the determined difference is not greater than the predetermined delay threshold, not tracking the TCP ACK arrival time.

A fourth example method according to the first example method, wherein at least one of i) the Start Delay Offset parameter corresponds to a difference between a proactive-allocation-data-received-index and a proactive-allocation-window-start-index, and ii) the proactive allocation window size is adapted based on learning using the Start Delay Offset parameter in connection with at least one of the second delay timer (DelayTimer #2) and Nth delay timer (DelayTimer #N), the Start Delay Offset parameter compensating for a timing mismatch between a first proactive allocation slot of the proactive allocation window and an actual proactive allocation slot of the proactive allocation window in which the data is received, whereby the Nth delay timer (DelayTimer #N, N>2) is added with the Start Delay Offset parameter.

An example method according to the first example method, wherein the method is applied to a Long Term Evolution (LTE) system using synchronous Hybrid Automatic Repeat Request (HARQ) in uplink (UL), and wherein to control Medium Access Control (MAC) layer HARQ feedback transmission from Evolved NodeB (eNB) to the user equipment (UE), the following is performed:

each proactive allocation slot in the proactive allocation window has DCI0 with RVO, whereby the eNB at least one of i) does not perform the HARQ soft combining by mistake when the UE retransmits padded data due to wrong HARQ feedback decoding, and ii) does not send a Negative Acknowledgement (NACK) for padded data sent by the UE with an error in the proactive allocation window.

An example method according to the first example method, wherein the method is applied to a Long Term Evolution (LTE) system using synchronous Hybrid Automatic Repeat Request (HARQ) in uplink (UL), and wherein to control Medium Access Control (MAC) layer HARQ feedback transmission from Evolved NodeB (eNB) to the user equipment (UE), the following is performed:

in the case of four proactive allocation slots provided in the proactive allocation window, if padding data transmitted by the UE in any one of the four proactive allocation slots is in Cyclic Redundancy Check (CRC) error, and the eNB has already received an intended Transmission Control Protocol Acknowledgement (TCP ACK) before a subframe in which synchronous retransmission occurs, then the eNB does not send a Negative Acknowledgement (NACK).

An example method according to the first example method, wherein the method is applied to a Long Term Evolution (LTE) system using synchronous Hybrid Automatic Repeat Request (HARQ) in uplink (UL), and wherein to control Medium Access Control (MAC) layer HARQ feedback transmission from Evolved NodeB (eNB) to the user equipment (UE), the following is performed:

in the case of four proactive allocation slots provided in the proactive allocation window, if the UE i) sends padding data in the first proactive allocation slot (Alloc #1) provided in the proactive allocation window, ii) sends in the second proactive allocation slot (Alloc #2) provided in the proactive allocation window the actual data which is in Cyclic Redundancy Check (CRC) error, and iii) sends padding data in the third and fourth proactive allocation slots (Alloc #3 and Alloc #4) provided in the proactive allocation window, then the proactive allocation window size is not extended, thereby allowing the UE to at least one of a) recover from the CRC error, b) send a Scheduling Request (SR) and c) transmit a Transmission Control Protocol Acknowledgement (TCP ACK).

An example method according to the first example method, wherein the method is applied to a Long Term Evolution (LTE) system using synchronous Hybrid Automatic Repeat Request (HARQ) in uplink (UL), and wherein to control Medium Access Control (MAC) layer HARQ feedback transmission from Evolved NodeB (eNB) to the user equipment (UE), the following is performed:

in the case of four proactive allocation slots provided in the proactive allocation window, if at least one of i) padding data transmitted by UE in any one of the four proactive allocation slots is in Cyclic Redundancy Check (CRC) error, ii) the UE is not able to catch up with the proactive allocation window size, and iii) padding data is transmitted in the fourth proactive allocation slot (Alloc #4) provided in the proactive allocation window without Buffer Status Report (BSR), then the eNB sends ACK as HARQ feedback for the padding data.

An example method according to the first example method, wherein the method is applied to a Long Term Evolution (LTE) system using synchronous Hybrid Automatic Repeat Request (HARQ) in uplink (UL), and wherein to control Medium Access Control (MAC) layer HARQ feedback transmission from Evolved NodeB (eNB) to the user equipment (UE), the following is performed:

in the case of four proactive allocation slots provided in the proactive allocation window, if all four proactive allocation slots are in Cyclic Redundancy Check (CRC) error, the proactive allocation window size is not extended, thereby allowing the UE to at least one of a) recover from the CRC error, b) send a Scheduling Request (SR) and c) transmit a Transmission Control Protocol Acknowledgement (TCP ACK).

An example method according to the first example method, wherein the method is applied to a 5G New Radio (NR) system using asynchronous Hybrid Automatic Repeat Request (HARQ) in uplink (UL), and wherein to control Medium Access Control (MAC) layer HARQ retransmission trigger from Next generation nodeB (gNB) to the user equipment (UE), the following is performed:

each proactive allocation slots in the proactive allocation window has DCI 0_0/0_1 with RVO, whereby the gNB i) does not perform HARQ soft combining by mistake, and ii) does not send DCI 0_0/0_1 with any retransmission for any padded data sent by the UE with error in the proactive allocation window.

An example method according to the first example method, wherein the method is applied to a 5G New Radio (NR) system using asynchronous Hybrid Automatic Repeat Request (HARQ) in uplink (UL), and wherein to control Medium Access Control (MAC) layer HARQ retransmission trigger from Next generation nodeB (gNB) to the user equipment (UE), the following is performed:

in the case of four proactive allocation slots provided in the proactive allocation window, if padding data transmitted by UE in any one of the four proactive allocation slots is in Cyclic Redundancy Check (CRC) error, and the gNB has already received an intended Transmission Control Protocol Acknowledgement (TCP ACK) before a subframe in which intended asynchronous retransmission is to be triggered by the gNB, then the gNB does not trigger the retransmission for a corresponding Physical Uplink Shared Channel (PUSCH).

An example method according to the first example method, wherein the method is applied to a 5G New Radio (NR) system using asynchronous Hybrid Automatic Repeat Request (HARQ) in uplink (UL), and wherein to control Medium Access Control (MAC) layer HARQ retransmission trigger from Next generation nodeB (gNB) to the user equipment (UE), the following is performed:

in the case of four proactive allocation slots provided in the proactive allocation window, if the UE i) sends padding data in the first proactive allocation slot (Alloc #1) provided in the proactive allocation window, ii) sends in the second proactive allocation slot (Alloc #2) provided in the proactive allocation window the actual data which is in Cyclic Redundancy Check (CRC) error, and iii) sends padding data in the third and fourth proactive allocation slots (Alloc #3 and Alloc #4) provided in the proactive allocation window, then the proactive allocation window size is not extended, thereby allowing the UE to at least one of a) recover from the CRC error, b) send a Scheduling Request (SR) and c) transmit a Transmission Control Protocol Acknowledgement (TCP ACK).

An example method according to the first example method, wherein the method is applied to a 5G New Radio (NR) system using asynchronous Hybrid Automatic Repeat Request (HARQ) in uplink (UL), and wherein to control Medium Access Control (MAC) layer HARQ retransmission trigger from Next generation nodeB (gNB) to the user equipment (UE), the following is performed:

in the case of four proactive allocation slots provided in the proactive allocation window, if at least one of i) padding data transmitted by UE in any one of the four proactive allocation slots is in Cyclic Redundancy Check (CRC) error, ii) the UE is not able to catch up with the proactive allocation window size, and iii) padding data is transmitted in the fourth proactive allocation slot (Alloc #4) provided in the proactive allocation window without Buffer Status Report (BSR), then the gNB sends ACK as HARQ feedback for the padding data.

An example method according to the first example method, wherein the method is applied to a 5G New Radio (NR) system using asynchronous Hybrid Automatic Repeat Request (HARQ) in uplink (UL), and wherein to control Medium Access Control (MAC) layer HARQ retransmission trigger from Next generation nodeB (gNB) to the user equipment (UE), the following is performed:

in the case of four proactive allocation slots provided in the proactive allocation window, if all four proactive allocation slots are in Cyclic Redundancy Check (CRC) error, the proactive allocation window size is not extended, thereby allowing the UE to at least one of a) recover from the CRC error, b) send a Scheduling Request (SR), and c) not trigger retransmit Downlink Control Information (DCI).

An example method according to the first example method, further comprising:

adapting Outer Loop Rate Control (OLRC) algorithm by performing the following:

in the case of four proactive allocation slots provided in the proactive allocation window, at least one of i) if all four proactive allocation slots are in Cyclic Redundancy Check (CRC) error, and if a padding data is received in at least one of the proactive allocation slots, then not update the Acknowledgment (ACK) response in the OLRC Step Up calculation, and ii) if intended data packet is received in at least one of the proactive allocation slots, and Hybrid Automatic Repeat Request (HARQ) process status and OLRC are active, then update the ACK and Negative Acknowledgment (NACK) responses in the OLRC Step Up and Step Down calculations.

An example method according to the third example method, wherein the method is applied to handle one TCP session among multiple TCP sessions per Radio Bearer, whereby the steps of the method are applied only for one selected TCP session among the multiple TCP sessions until the selected TCP session has ended.

An example method according to the fourth example method, wherein:

in the case 4 proactive allocations are provided in the proactive allocation window, if PUSCH data is received for the third allocation, the delay timer is advanced by two TTIs to match UE TCP ACK timing.

GLOSSARY OF TERMS

ACK—Acknowledgement
ACK SN—Acknowledgement Sequence Number
AM—Acknowledgement Mode
App—Application
BO—Buffer Occupancy
BSR—Buffer Status Report
BWP—Bandwidth Part
CBG—Code Block Groups
CRC—Cyclic Redundancy Check
CU—Centralized Unit
DCI—Downlink Control Information
DL—Downlink
DU—Distributed Unit
eNB—Evolved NodeB
gNB—Next generation nodeB
HARQ—Hybrid Automatic Repeat Request
ICMP—Internet Control Message Protocol
IP—Internet Protocol
KPI—Key Performance Indicator
L3—Layer—3
LCID—Logical Channel Identifier
LTE—Long Time Evolution
MAC—Medium Access Control
MCS—Modulation and Coding Scheme
NACK—Negative Acknowledgement NR—New Radio
OLRC—Outer Loop Rate Control
PA—Proactive Allocation
PDCP—Packet Data Convergence Protocol
PDSCH—Physical Downlink Shared Channel
PDU—Protocol Data Unit
PHR—Power Headroom Report
PING—Packet Internet Grope
PRB—Physical Resource Block
PUCCH—Physical Uplink Control Channel
PUSCH—Physical Uplink Shared Channel
QoE—Quality of Experience
RLC—Radio Link Control
RTT—Round Trip Time
RV—Redundancy Version
SF—Subframe Number
SFN—System Frame Number
SR—Scheduling Request
TCP—Transmission Control Protocol
TCP ACK—Transmission Control Protocol Acknowledgement
TB—Transport Block
TPC—Transmit Power Control
TTI—Transmit Time Interval
UDP—User Datagram Protocol
UE—User Equipment
UL—Uplink

What is claimed is:

1. A method for reducing Transmission Control Protocol Acknowledgement (TCP ACK) latency by estimating a time of TCP ACK packet arrival in one of a 5G New Radio (NR) and a Long Term Evolution (LTE) system, comprising:
    estimating a first delay timer (DelayTimer #1) as a sum of time for user equipment (UE) feedback for downlink (DL) data, time for TCP application ACK response, and time for UE uplink (UL) application and L3 processing;
    starting a first proactive allocation window comprising the number of transmission time intervals (TTIs) over which proactive allocations are given to the UE following the first delay timer; and
    estimating a second delay timer (DelayTimer #2) as a sum of the time for UE feedback for DL data, the time for TCP application ACK response, the time for UE UL application and L3 processing, and time for Start Delay Offset parameter representing a timing mismatch between a first proactive allocation slot of the first proactive allocation window and an actual proactive allocation slot of the first proactive allocation window in which the data is received.

2. The method according to claim 1, further comprising: adapting the size of a second proactive allocation window based on learning using the Start Delay Offset parameter.

3. The method according to claim 2, wherein:
    in the case 4 proactive allocations are provided in the proactive allocation window, if PUSCH data is received for the third allocation, the delay timer is advanced by two TTIs to match UE TCP ACK timing.

4. The method according to claim 1, wherein the method is applied to a Long Term Evolution (LTE) system using synchronous Hybrid Automatic Repeat Request (HARQ) in uplink (UL), and wherein to control Medium Access Control (MAC) layer HARQ feedback transmission from Evolved NodeB (eNB) to the user equipment (UE),
    the eNB does not send a Negative Acknowledgement (NACK) for padded data sent by the UE with an error in the proactive allocation window.

5. The method according to claim 1, wherein the method is applied to a Long Term Evolution (LTE) system using synchronous Hybrid Automatic Repeat Request (HARQ) in uplink (UL), and wherein to control Medium Access Control (MAC) layer HARQ feedback transmission from Evolved NodeB (eNB) to the user equipment (UE), the following is performed:
    in the case of four proactive allocation slots provided in the proactive allocation window, if padding data transmitted by the UE in any one of the four proactive allocation slots is in Cyclic Redundancy Check (CRC) error, and the eNB has already received an intended Transmission Control Protocol Acknowledgement (TCP ACK) before a subframe in which synchronous retransmission occurs, then the eNB does not send a Negative Acknowledgement (NACK).

6. The method according to claim 1, wherein the method is applied to a Long Term Evolution (LTE) system using synchronous Hybrid Automatic Repeat Request (HARQ) in uplink (UL), and wherein to control Medium Access Control (MAC) layer HARQ feedback transmission from Evolved NodeB (eNB) to the user equipment (UE), the following is performed:
    in the case of four proactive allocation slots provided in the proactive allocation window, if the UE i) sends padding data in the first proactive allocation slot (Alloc #1) provided in the proactive allocation window, ii) sends in the second proactive allocation slot (Alloc #2) provided in the proactive allocation window the actual data which is in Cyclic Redundancy Check (CRC) error, and iii) sends padding data in the third and fourth proactive allocation slots (Alloc #3 and Alloc #4) provided in the proactive allocation window, then the proactive allocation window size is not extended, thereby allowing the UE to at least one of a) recover from the CRC error, b) send a Scheduling Request (SR) and c) transmit a Transmission Control Protocol Acknowledgement (TCP ACK).

7. The method according to claim 1, wherein the method is applied to a Long Term Evolution (LTE) system using synchronous Hybrid Automatic Repeat Request (HARQ) in uplink (UL), and wherein to control Medium Access Control (MAC) layer HARQ feedback transmission from Evolved NodeB (eNB) to the user equipment (UE), the following is performed:
    in the case of four proactive allocation slots provided in the proactive allocation window, if at least one of i) padding data transmitted by UE in any one of the four proactive allocation slots is in Cyclic Redundancy Check (CRC) error, ii) the UE is not able to catch up with the proactive allocation window size, and iii) padding data is transmitted in the fourth proactive allocation slot (Alloc #4) provided in the proactive allocation window without Buffer Status Report (BSR), then the eNB sends ACK as HARQ feedback for the padding data.

8. The method according to claim 1, wherein the method is applied to a Long Term Evolution (LTE) system using synchronous Hybrid Automatic Repeat Request (HARQ) in uplink (UL), and wherein to control Medium Access Control (MAC) layer HARQ feedback transmission from Evolved NodeB (eNB) to the user equipment (UE), the following is performed:
    in the case of four proactive allocation slots provided in the proactive allocation window, if all four proactive allocation slots are in Cyclic Redundancy Check (CRC) error, the proactive allocation window size is not extended, thereby allowing the UE to at least one of a) recover from the CRC error, b) send a Scheduling Request (SR) and c) transmit a Transmission Control Protocol Acknowledgement (TCP ACK).

9. The method according to claim 1, wherein the method is applied to a 5G New Radio (NR) system using asynchronous Hybrid Automatic Repeat Request (HARQ) in uplink (UL), and wherein to control Medium Access Control (MAC) layer HARQ retransmission trigger from Next generation nodeB (gNB) to the user equipment (UE),
 the gNB does not send DCI 0_0/0_1 with any retransmission for any padded data sent by the UE with error in the proactive allocation window.

10. The method according to claim 1, wherein the method is applied to a 5G New Radio (NR) system using asynchronous Hybrid Automatic Repeat Request (HARQ) in uplink (UL), and wherein to control Medium Access Control (MAC) layer HARQ retransmission trigger from Next generation nodeB (gNB) to the user equipment (UE), the following is performed:
 in the case of four proactive allocation slots provided in the proactive allocation window, if padding data transmitted by UE in any one of the four proactive allocation slots is in Cyclic Redundancy Check (CRC) error, and the gNB has already received an intended Transmission Control Protocol Acknowledgement (TCP ACK) before a subframe in which intended asynchronous retransmission is to be triggered by the gNB, then the gNB does not trigger the retransmission for a corresponding Physical Uplink Shared Channel (PUSCH).

11. The method according to claim 1, wherein the method is applied to a 5G New Radio (NR) system using asynchronous Hybrid Automatic Repeat Request (HARQ) in uplink (UL), and wherein to control Medium Access Control (MAC) layer HARQ retransmission trigger from Next generation nodeB (gNB) to the user equipment (UE), the following is performed:
 in the case of four proactive allocation slots provided in the proactive allocation window, if the UE i) sends padding data in the first proactive allocation slot (Alloc #1) provided in the proactive allocation window, ii) sends in the second proactive allocation slot (Alloc #2) provided in the proactive allocation window the actual data which is in Cyclic Redundancy Check (CRC) error, and iii) sends padding data in the third and fourth proactive allocation slots (Alloc #3 and Alloc #4) provided in the proactive allocation window, then the proactive allocation window size is not extended, thereby allowing the UE to at least one of a) recover from the CRC error, b) send a Scheduling Request (SR) and c) transmit a Transmission Control Protocol Acknowledgement (TCP ACK).

12. The method according to claim 1, wherein the method is applied to a 5G New Radio (NR) system using asynchronous Hybrid Automatic Repeat Request (HARQ) in uplink (UL), and wherein to control Medium Access Control (MAC) layer HARQ retransmission trigger from Next generation nodeB (gNB) to the user equipment (UE), the following is performed:
 in the case of four proactive allocation slots provided in the proactive allocation window, if at least one of i) padding data transmitted by UE in any one of the four proactive allocation slots is in Cyclic Redundancy Check (CRC) error, ii) the UE is not able to catch up with the proactive allocation window size, and iii) padding data is transmitted in the fourth proactive allocation slot (Alloc #4) provided in the proactive allocation window without Buffer Status Report (BSR), then the gNB sends ACK as HARQ feedback for the padding data.

13. The method according to claim 1, wherein the method is applied to a 5G New Radio (NR) system using asynchronous Hybrid Automatic Repeat Request (HARQ) in uplink (UL), and wherein to control Medium Access Control (MAC) layer HARQ retransmission trigger from Next generation nodeB (gNB) to the user equipment (UE), the following is performed:
 in the case of four proactive allocation slots provided in the proactive allocation window, if all four proactive allocation slots are in Cyclic Redundancy Check (CRC) error, the proactive allocation window size is not extended, thereby allowing the UE to at least one of a) recover from the CRC error, b) send a Scheduling Request (SR), and c) not trigger retransmit Downlink Control Information (DCI).

14. The method according to claim 1, further comprising:
 adapting Outer Loop Rate Control (OLRC) algorithm by performing the following:
 in the case of four proactive allocation slots provided in the proactive allocation window, at least one of i) if all four proactive allocation slots are in Cyclic Redundancy Check (CRC) error, and if a padding data is received in at least one of the proactive allocation slots, then not update the Acknowledgment (ACK) response in the OLRC Step Up calculation, and ii) if intended data packet is received in at least one of the proactive allocation slots, and Hybrid Automatic Repeat Request (HARQ) process status and OLRC are active, then update the ACK and Negative Acknowledgment (NACK) responses in the OLRC Step Up and Step Down calculations.

* * * * *